(12) United States Patent
Bulin et al.

(10) Patent No.: US 8,381,509 B2
(45) Date of Patent: Feb. 26, 2013

(54) METHOD AND SYSTEM FOR STARTING A TURBOSHAFT ENGINE BY COLD WEATHER

(75) Inventors: Guillaume Bulin, Blagnac (FR); Pierre Jacquet Francillon, Grenade (FR)

(73) Assignee: Airbus Operations SAS, Toulouse (FR)

( * ) Notice: Subject to any disclaimer, the term of this patent is extended or adjusted under 35 U.S.C. 154(b) by 267 days.

(21) Appl. No.: 12/596,976

(22) PCT Filed: Apr. 14, 2008

(86) PCT No.: PCT/FR2008/000514
§ 371 (c)(1),
(2), (4) Date: Oct. 21, 2009

(87) PCT Pub. No.: WO2008/142287
PCT Pub. Date: Nov. 27, 2008

(65) Prior Publication Data
US 2010/0107648 A1    May 6, 2010

(30) Foreign Application Priority Data
Apr. 23, 2007 (FR) .................................. 07 02921

(51) Int. Cl.
*B63H 11/00* (2006.01)
(52) U.S. Cl. ............................. 60/204; 60/39.08; 60/266
(58) Field of Classification Search .............. 60/39.08, 60/266, 778, 788, 204; 184/6.11
See application file for complete search history.

(56) References Cited

U.S. PATENT DOCUMENTS

| | | | | |
|---|---|---|---|---|
| 3,451,214 A * | 6/1969 | Bradley | ............. | 60/788 |
| 4,151,710 A * | 5/1979 | Griffin et al. | ............. | 60/39.08 |
| 4,741,152 A | 5/1988 | Burr | | |
| 4,773,212 A * | 9/1988 | Griffin et al. | ............. | 60/772 |
| 5,615,547 A * | 4/1997 | Beutin et al. | ............. | 60/39.08 |
| 2007/0265761 A1* | 11/2007 | Dooley et al. | ............. | 701/100 |
| 2008/0121376 A1* | 5/2008 | Schwarz et al. | ......... | 165/104.28 |

FOREIGN PATENT DOCUMENTS

GB    2 260 577    4/1993

OTHER PUBLICATIONS

International Search Report dated Dec. 8, 2008 w/ English translation.
Written Opinion of the International Searching Authority with English translation, Oct. 21, 2009.

* cited by examiner

*Primary Examiner* — Phutthiwat Wongwian
(74) *Attorney, Agent, or Firm* — Dickinson Wright PLLC

(57) ABSTRACT

A method for starting up an aircraft turbine engine using an electric starter is provided. The aircraft turbine engine is provided with at least one hydraulic fluid circuit for lubricating the aircraft turbine engine, the aircraft turbine engine lubricating circuit is provided with a temperature-regulating section that is able to remove the heat generated by the aircraft turbine engine when the aircraft turbine engine is running, the electric starter is provided with at least one hydraulic fluid circuit for lubricating parts of the electric starter, and the lubricating circuit of the electric starter is provided with the temperature-regulating section that is able to remove the heat emitted by the electric starter when the lubricating circuit of the electric starter is operating.

7 Claims, 3 Drawing Sheets

METHOD AND SYSTEM FOR STARTING A TURBOSHAFT ENGINE BY COLD WEATHER

FIELD OF THE INVENTION

The present invention relates to a method for starting a turbine engine in cold weather and to a turbine engine, particularly for an aircraft, that implements this method.

BACKGROUND OF THE INVENTION

It is known that, in order to start a turbine engine, use is made of a starter that delivers a driving torque to the shaft of said turbine engine. A driving torque such as this is intended to overcome all of the resistive torques imposed on said shaft and which are chiefly the result of the aerodynamic drag of the rotating parts, of the mechanical friction of the contacting parts and of losses by viscous friction between the contacting parts immersed in the fluid of at least one lubricating and/or heat-regulating hydraulic circuit associated with said turbine engine. The starter gradually accelerates the turbine engine and, when a preset rotational speed is reached, injection and ignition of fuel into/in the combustion chamber of the turbine engine are initiated. Then at another preset rotational speed, the action of the starter is halted and the turbine engine continues to accelerate up to its idling speed by virtue of the combustion of said fuel.

Known starters may be of the pneumatic type (in which a turbine is supplied with compressed air), but they are increasingly of an electrical type. In the latter instance, these are generally synchronous machines operating as motors during the turbine engine starting phase and operating as generators when the aircraft is in flight. In that which follows, only starters of an electrical type will be considered.

It will be readily understood that, in cold weather (for example when the ambient temperature and the temperature of the fluid in the hydraulic circuit associated with the turbine engine is below −20° C.) said fluid sets solid, thus greatly increasing the resistive torque that the electric starter has to overcome in order to start said turbine engine. Of course, the electric starter has to be able to perform such starting operations in cold weather, and this means that its power is rated for that. However, it must be pointed out that cold-weather starts are relatively infrequent events in the life of an aircraft, which means that it becomes necessary to use either starters that are excessively powerful and therefore heavy for most starting sequences, or procedures whereby the turbine engine hydraulic circuit is heated using external heat sources.

The disadvantage of an aircraft electric starter having excessive mass and excessive power is further exacerbated by the fact that, for airplane system electrical architecture reasons, there are two electric starters per turbine engine. This way, said turbine engine can be started even in the event of failure of one of the electric starters.

Furthermore, it should be noted that the viscous resistive torque developed by a turbine engine while it is being started in cold weather is difficult to predict with any accuracy. It is dependent on the precise temperature of the turbine engine fluid at the time of starting, on the quality and properties of this fluid, on the relative deformation of the contacting mechanical parts which is associated with the ambient temperature, and on other parameters that are difficult to predict. This is why the starter is rated on the basis of resistive torque curves that incorporate a design margin. Nonetheless, this precaution will not guarantee that the power of the starter will cover all cold weather starting scenarios which the aircraft is liable to encounter. The user has therefore to follow special procedures before attempting to start the engine in cold weather, which procedures prove detrimental to aircraft availability and operability and are unable to prevent failed attempts at starting turbine engines.

In order to remedy these disadvantages, document GB-A-2 260 577 describes a method for starting up a turbine engine using an electric starter, said turbine engine being provided with at least one hydraulic fluid circuit for lubricating at least certain parts of said turbine engine, according to which method, when said turbine engine is being started in cold weather, at least some of the heat energy generated by said electric starter is transferred to the hydraulic fluid of the turbine engine lubricating circuit.

Thus, the hydraulic fluid (oil) of the turbine engine lubricating circuit is heated up by said electric starter at the time of a cold start, such that the viscosity of said hydraulic fluid is reduced, thus reducing the resistive torque generated by this fluid. This results in shorter starting times, smaller starters, and lower risks of aborted starts.

SUMMARY OF THE INVENTION

It is an object of the present invention to improve the known method described hereinabove in the case where the turbine engine lubricating circuit is provided with temperature-regulating means capable of removing the heat emitted by said turbine engine when it is operating. In this case, according to the invention, in order to speed up the heating of the hydraulic fluid of said turbine engine lubricating circuit, said temperature-regulating means of the turbine engine lubricating circuit are inhibited while heat energy is being transferred from the electric starter to the hydraulic fluid of the turbine engine lubricating circuit.

Although the method according to the present invention can be implemented at temperatures that are not particularly low, in practice, heat energy is transferred from the electric starter to the hydraulic fluid of the turbine engine lubricating circuit when the temperature therein is at least approximately below −20° C.

When, in the usual way, the starter is provided with at least one hydraulic fluid circuit for lubricating at least certain parts of said starter, it is advantageous for the heat energy to be transferred from the starter to the hydraulic fluid of the turbine engine lubricating circuit via said starter lubricating circuit.

If, in addition, said starter lubricating circuit is provided with temperature-regulating means capable of removing the heat emitted by said starter when it is operating, then it is preferable, as far as the rate at which the hydraulic fluid of the turbine engine lubricating circuit heats up, for said starter lubricating circuit temperature-regulating means to be inhibited while heat energy is being transferred from the electric starter to the hydraulic fluid of the turbine engine lubricating circuit.

The transfer of heat energy from the starter to the hydraulic fluid of the turbine engine lubricating circuit may be continued until the engine turbine starts up or else until the temperature of this hydraulic fluid reaches a first preset value corresponding to a normal viscosity of said fluid. When said transfer of heat energy is designed to be continued up to the time of starting, then it is advantageous to provide a safety feature capable of interrupting said transfer of heat energy before said start, if the temperature of the hydraulic fluid of the turbine engine lubricating circuit reaches a preset second value that carries the risk of damaging the engine.

The present invention also relates to a system for starting up a turbine engine using an electric starter, said turbine engine and said starter each comprising a hydraulic lubricating circuit provided with heat-removal temperature-regulating means. According to the present invention, in order to make it easier to start said turbine engine in cold weather, said system is notable in that it comprises:

controllable means for the one-way transfer of heat energy between the starter hydraulic lubricating circuit and the turbine engine lubricating hydraulic circuit; and controllable means of inhibiting the temperature-regulating means of the turbine engine and starter lubricating hydraulic circuits.

In an alternative form of embodiment of the system according to the present invention, in which a part of said turbine engine lubricating hydraulic circuit temperature-regulating means is operational when said aircraft is resting on the ground, advantageously:

said starter lubricating hydraulic circuit does not per se comprise temperature-regulating means that are operational when the aircraft is resting on the ground; and said controllable means for the one-way transfer of heat energy provide a connection between said starter lubricating hydraulic circuit and said part of the turbine engine hydraulic circuit temperature-regulating means so that said part provides temperature regulation for said starter lubricating hydraulic circuit when the aircraft is resting on the ground.

BRIEF DESCRIPTION OF THE DRAWINGS

The figures of the attached drawing will make it easy to understand how the invention may be embodied. In these figures, identical references denote elements which are similar.

DETAILED DESCRIPTION OF THE INVENTION

Figure 1:
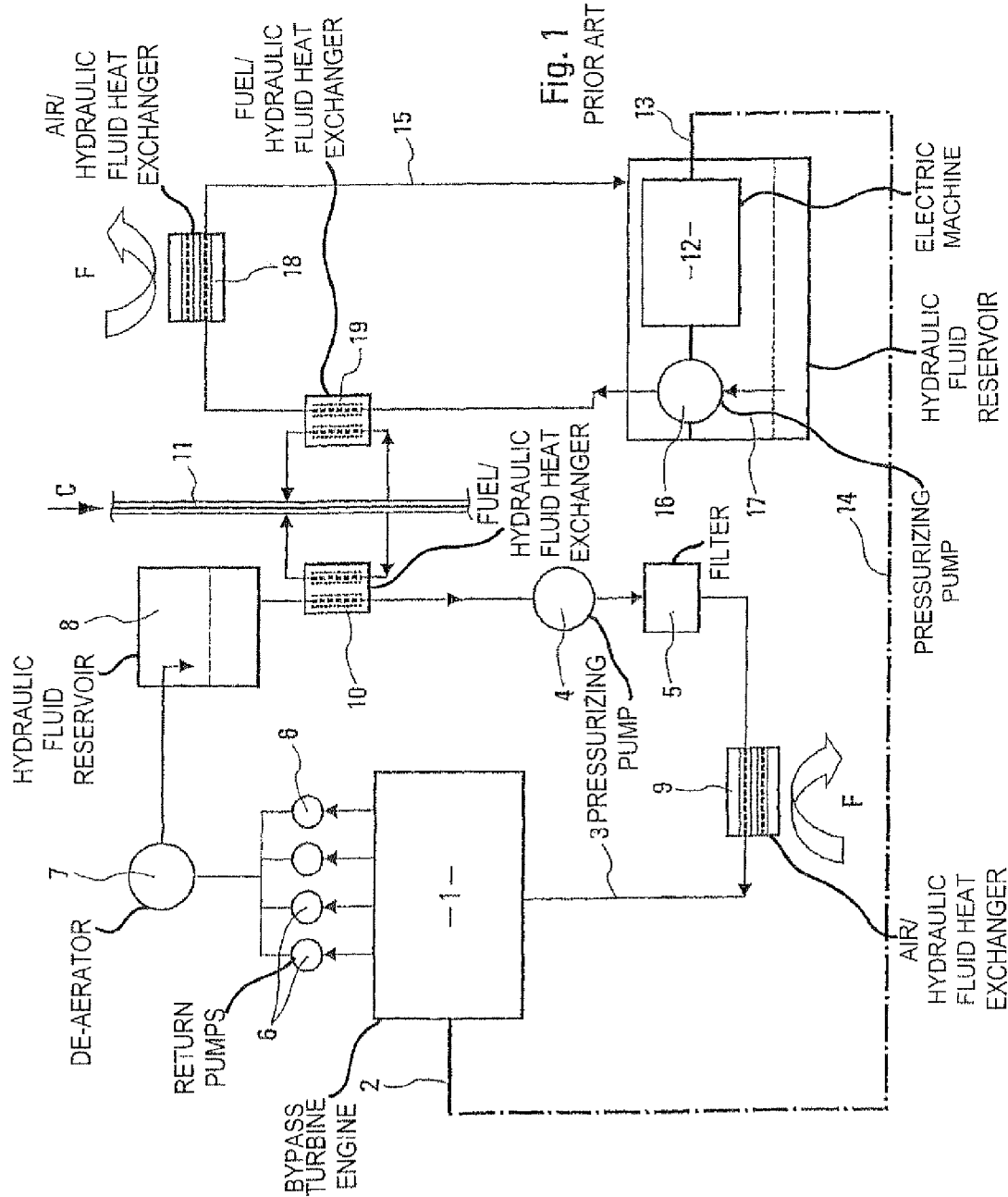
FIG. 1 is a diagram illustrating an example of a known system for a turbine engine and its electric starter, and for the hydraulic circuits thereof.

FIG. 1 schematically depicts, in the form of a rectangle, a bypass turbine engine 1 for an aircraft (not depicted). The turbine engine is provided with a shaft 2 and through it there passes a hydraulic fluid that flows through at least one hydraulic circuit 3.

The circuit 3 of known type, depicted by way of example in FIG. 1, comprises a pressurizing pump 4, a filter 5, return pumps 6, a de-aerator 7 and a hydraulic fluid (oil) reservoir 8.

The circuit 3 is intended to lubricate at least certain parts of the turbine engine 1 and provide the latter with a suitable operating temperature. Thus, said circuit 3 comprises at least one device capable of cooling the hydraulic fluid and of regulating the temperature thereof. In the example depicted the following achieve this:

an air/hydraulic fluid heat exchanger 9 capable of dissipating the heat energy of said hydraulic fluid in an airflow F passing through the turbine engine 1 (the cold fan stream) or surrounding said turbine engine. An exchanger such as this may be of the plate type or of the tube type or alternatively may be of the surface type positioned on the walls of the turbine engine nacelle. Of course, the heat exchanger 9, although it may be effective up to a point when the aircraft is resting on the ground, is effective mainly when said aircraft is in motion; and a fuel/hydraulic fluid heat exchanger 10 capable of dissipating the heat energy of said hydraulic fluid in a flow of fuel C which flows through a pipe 11. The heat exchanger 10 may be effective when the aircraft is resting on the ground, because the temperature of the fuel is generally lower than that of said hydraulic fluid.

Furthermore, FIG. 1 depicts, again schematically in the form of a rectangle, an electric machine of the starter/generator type 12, the shaft 13 of which can be coupled to the shaft 2 of the turbine engine 1 by a coupling 14 (depicted in chain line) in order to start said turbine engine. In a similar way to that which has been described hereinabove, the electric machine 12 is lubricated and has its temperature regulated by a hydraulic fluid flowing in at least one hydraulic circuit 15.

The circuit 15, of known type, depicted by way of example in FIG. 3, comprises a pressurizing pump 16, a hydraulic fluid reservoir 17, an air/hydraulic fluid heat exchanger 18 (similar to the exchanger 9 described hereinabove) and a fuel/hydraulic fluid heat exchanger 19 (similar to the exchanger 10 mentioned hereinabove).

It will be readily understood that, in operation, the turbine engine 1 and the electric machine 12 can be lubricated and temperature-regulated by the circuits 3 and 15 respectively.

It is an object of the present invention to improve the known system of FIG. 1, firstly, to improve the starting of the turbine engine 1 by the electric machine 12 when, in cold weather, the temperature of the hydraulic fluid of the circuit 3 is very low, in particular below −20° C., and, secondly, to remove the heat energy dissipated by the electric machine 12 on the ground.

Figure 2:
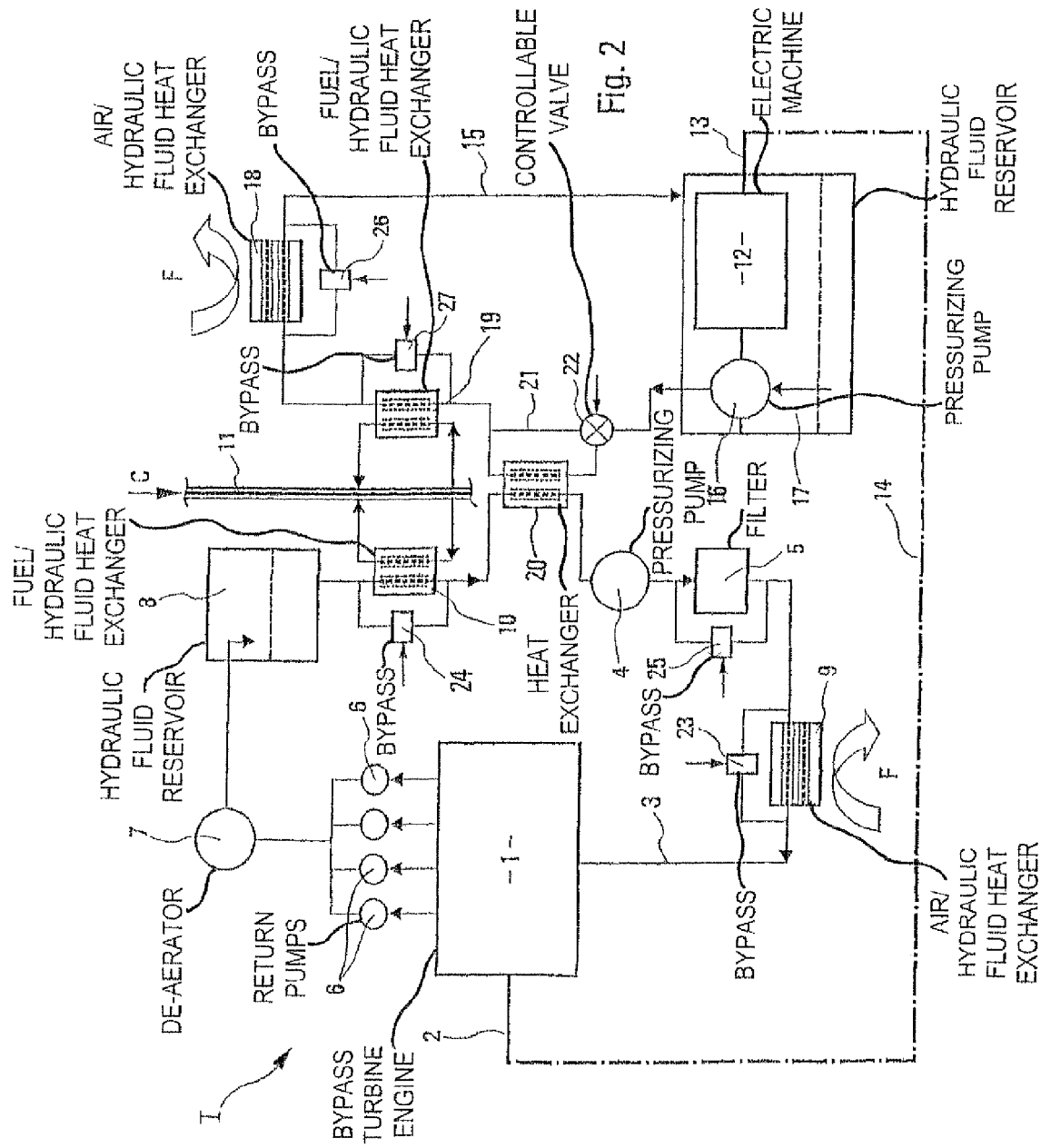
FIG. 2 illustrates, in a view similar to FIG. 1, a first embodiment of the present invention for improving the known system of said FIG. 1.

FIG. 2 depicts a first example of a system I according to the present invention and that is an improvement on the system of FIG. 1. This FIG. 2 again shows all the elements 1 to 19, F and C described hereinabove.

In addition, the system I comprises:

a heat exchanger 20 positioned between the hydraulic circuits 3 and 15 and that can be inhibited, on the circuit 15 side, by a bypass 21 under the control of a controllable valve 22;

controllable bypasses 23, 24, 25 mounted respectively in parallel with the heat exchangers 9 and 10 and with the filter 5 in order to be able to inhibit the action of these elements of the hydraulic circuit 3; and controllable bypasses 26 and 27 mounted respectively in parallel with the heat exchangers 18 and 19 in order to be able to inhibit the action of these exchangers of the hydraulic circuit 15.

When the turbine engine 1 is being started by the starter 12 under normal temperature conditions, the bypass 21 is open under the action of the controllable valve 22, so that there is no thermal connection between the hydraulic circuits 3 and 15 via the exchanger 20. In addition, the bypasses 23 to 27 are closed so that the elements 9, 10, 5, 18 and 19 are not inhibited. From a heat exchange point of view, the system I of FIG. 2 is then in the same condition as the known system of FIG. 1.

By contrast, when the turbine engine 1 is being started by the starter 12 in cold weather, the valve 22 is made to inhibit the bypass 21 and cause the hydraulic fluid of the circuit 15 to pass through the exchanger 20. The hydraulic fluid of the circuit 3 is therefore heated up by that of the circuit 15, that is to say by the heat energy dissipated by the starter 12, something which, as mentioned hereinabove, encourages or even allows the turbine engine 1 to start. Such heating of the hydraulic fluid of the circuit 3 is encouraged and accelerated by the fact that the elements 5, 9, 10, 18 and 19 are then short-circuited by the corresponding bypasses 23 to 27 which are made to be open.

This cold-weather starting condition with the bypass 21 closed and the bypasses 23 to 27 open can be maintained until the temperature of the hydraulic fluid of the circuit 3 reaches a preset value or alternatively until the engine 1 starts.

In the latter instance, if the temperature of the fluid of the hydraulic circuit were to reach a temperature that carried the risk of damaging said turbine engine, then the transfer of heat would be interrupted by opening the bypass 21 by operating the valve 22. In addition, the bypass 24 and possibly the bypass 23 would then be closed, so as to actuate the corresponding heat exchanger 10, 9. In addition, it would be possible to activate the heat exchanger 19, and possibly the heat exchanger 18, in the same way.

In the alternative form of the embodiment of the invention illustrated by the system II in FIG. 3, we again find all the elements of system I of FIG. 2, except for the heat exchanger 19 (effective mainly at rest on the ground) and its bypass 27. In the system II, the entire heat exchanger 20, bypass 21 and valve 22 assembly not only serves to heat the fluid of the hydraulic circuit 3 during cold starts as explained hereinabove but also allows the heat exchanger 10 (and possibly the exchanger 9) of the turbine engine 1 circuit 3 to act as the heat exchanger 19 during normal temperature starts.

Figure 3:
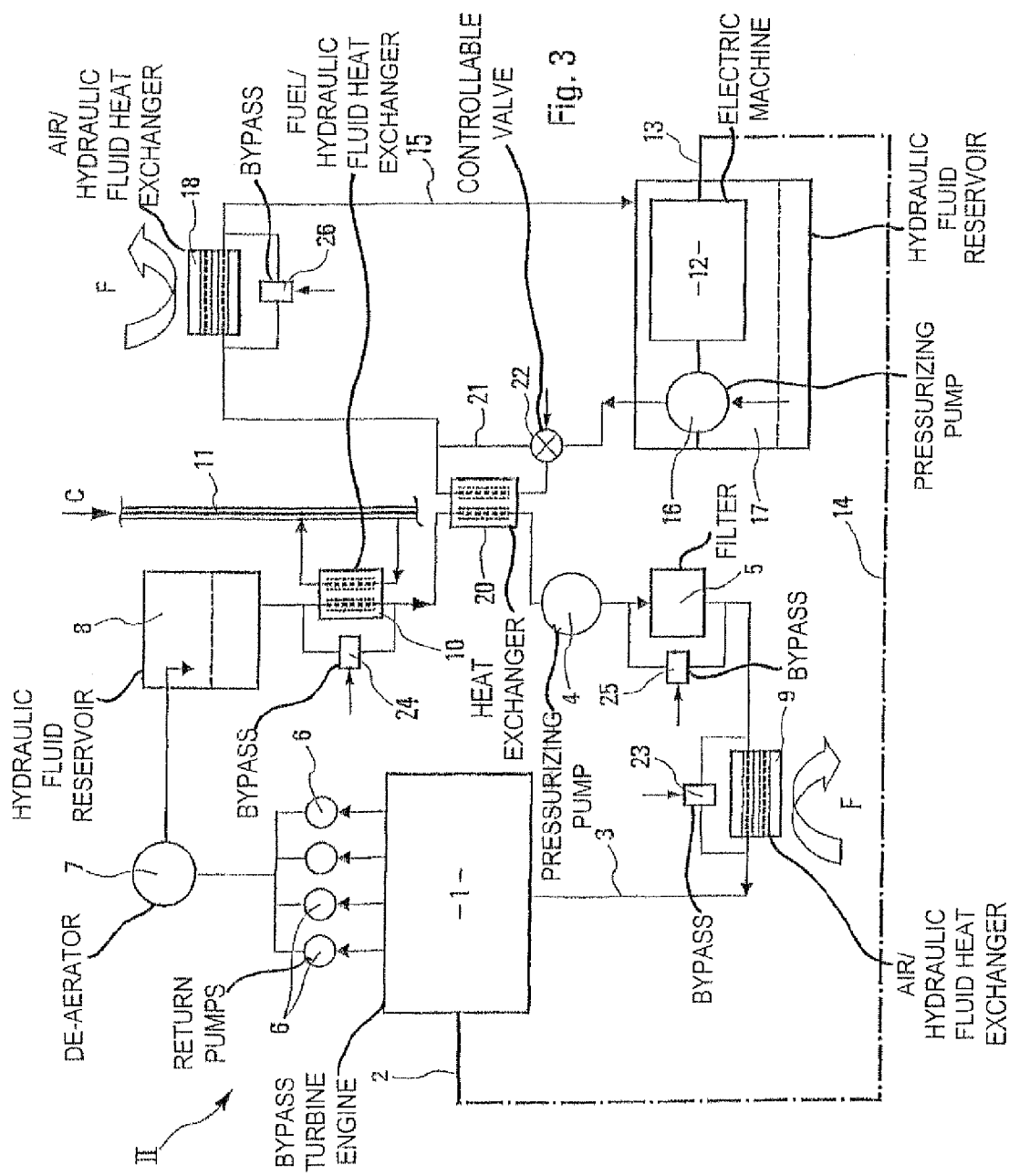
FIG. 3 illustrates a second embodiment of the present invention for improving the known system of FIG. 1.

What happens in the system II of FIG. 3 is that as soon as the starter 12 is actuated and irrespective of the temperature conditions, the valve 22 closes the bypass 21 so that the heat energy is transmitted from the hydraulic circuit 15 to the hydraulic circuit 3. As long as the temperature of the fluid in the hydraulic circuit 3 is below a preset value, the bypass 24 of the exchanger 10 (and possibly the bypass 23 of the exchanger 9) remains (remain) open, inhibiting said exchanger 10 (9). By contrast, as soon as the temperature reaches this preset value, the bypass 24 (23) is closed and the exchanger 10 (9) removes the heat in the fuel C.

Although the above examples have described the means of one-way transfer of heat energy between the hydraulic circuits 15 and 3 in the form of the heat exchanger 20 associated with the bypass 21 and with the controllable valve 22, it goes without saying that these means could be replaced by some other type of exchanger, such as thermosiphon heat ducts for example, thus making it possible to dispense with said controllable valve. In addition, these one-way transfer means may be duplicated to provide the system with redundancy in the event of failure, and they may advantageously be positioned in the tank 8 in order to be more effective.

The invention claimed is:

1. A method for starting up an aircraft turbine engine using an electric starter, said aircraft turbine engine being provided with at least one hydraulic fluid circuit for lubricating parts of said aircraft turbine engine, said hydraulic fluid circuit being provided with a temperature-regulating section that is configured to remove the heat generated by said aircraft turbine engine when said aircraft turbine engine is running, said electric starter being provided with at least one hydraulic fluid circuit for lubricating parts of said electric starter, said hydraulic fluid circuit of said electric starter being provided with a temperature-regulating section that is configured to remove the heat emitted by said electric starter when said lubricating circuit of said electric starter is operating, each of said temperature-regulating section of the hydraulic fluid circuit of the aircraft turbine engine and said temperature-regulating section of the hydraulic fluid circuit of the electric starter including at least one heat exchanger, said method comprising, when said aircraft turbine engine is being started in cold weather, the steps of:

inhibiting said temperature-regulating section of the hydraulic fluid circuit of the aircraft turbine engine;

inhibiting said temperature-regulating section of the hydraulic fluid circuit of the electric starter; and transferring to the hydraulic fluid circuit of the aircraft turbine engine at least some of the heat energy generated in the hydraulic fluid circuit of the electric starter by said electric starter.

2. The method as claimed in claim 1, wherein heat energy is transferred from the electric starter to the hydraulic fluid of said hydraulic fluid circuit of the aircraft turbine engine when the temperature therein is at least approximately below −20° C.

3. The method as claimed in claim 1, wherein heat energy is transferred from the electric starter to the hydraulic fluid of the hydraulic fluid circuit of the aircraft turbine engine via said hydraulic fluid circuit of the electric starter.

4. The method as claimed in claim 3, wherein said temperature-regulating section of said hydraulic fluid circuit of said electric starter is inhibited while heat energy is being transferred from the electric starter to the hydraulic fluid of the hydraulic fluid circuit of the aircraft turbine engine.

5. The method as claimed in claim 1, wherein the transfer of heat energy from the electric starter to the hydraulic fluid of said hydraulic fluid circuit of the aircraft turbine engine is continued until the temperature of the hydraulic fluid of said hydraulic fluid circuit of the aircraft turbine engine reaches a first preset value corresponding to a viscosity of said fluid.

6. The method as claimed in claim 1, wherein the transfer of heat energy from the electric starter to the hydraulic fluid of the hydraulic fluid circuit of the aircraft turbine engine is continued until said aircraft turbine engine starts.

7. The method as claimed in claim 6, wherein the transfer of heat energy from the electric starter to the hydraulic fluid of the hydraulic fluid circuit of the aircraft turbine engine is interrupted before said aircraft turbine engine starts, if the temperature of the hydraulic fluid of the aircraft engine reaches a second preset value that carries risk of damaging said aircraft turbine engine.

* * * * *